United States Patent [19]

Cross et al.

[11] Patent Number: 4,805,088
[45] Date of Patent: Feb. 14, 1989

[54] METHOD AND APPARATUS FOR MICROPROCESSOR CONTROLLED SPRAYER

[75] Inventors: Hewis W. Cross; Roger T. Paulk, both of Albany, Ga.

[73] Assignee: Cross Equipment Company, Inc., Albany, Ga.

[21] Appl. No.: 29,044

[22] Filed: Mar. 23, 1987

[51] Int. Cl.$^4$ .......................... G06F 15/20; B05B 9/06
[52] U.S. Cl. ..................... 364/172; 222/613; 239/69; 239/74; 239/155; 364/424.07; 364/510
[58] Field of Search ............... 364/140, 141, 143–145, 364/420, 509, 510, 424; 239/63, 69–74, 77, 155, 156, 159, 162, 163, 172, 677; 222/160, 608, 610, 613, 614–617, 623–627

[56] References Cited

U.S. PATENT DOCUMENTS

| | | | |
|---|---|---|---|
| 4,052,003 | 10/1977 | Steffen | 239/155 X |
| 4,392,611 | 7/1983 | Bachman et al. | 364/510 X |
| 4,523,280 | 6/1985 | Bachman | 364/510 X |
| 4,553,702 | 11/1985 | Coffee et al. | 239/172 X |
| 4,580,721 | 4/1986 | Coffee et al. | 239/172 X |

*Primary Examiner*—Joseph Ruggiero
*Attorney, Agent, or Firm*—Fred K. Carr

[57] ABSTRACT

This invention relates to an improved method and apparatus for application of agrochemicals from a moving vehicle. It utilizes a multiple chemical infusion system for mobile spraying of liquid mixtures at present, controlled, and monitored application rates which integrate ground speed, solute concentration, diluent volume and spray swath path width using dynamic, real time software in a digital computer unit with a read only memory chip. Microprocessor controlled peristalic squeeze pumps, capable of simultaneous or independent application of a plurality of chemicals, infuse chemicals to be applied into solvent water where the mixture is delivered to a boomless spray assembly by a centrifugal pump or application. The microprocessor is controlled by the operator of the moving vehicle.

21 Claims, 14 Drawing Sheets

METHOD AND APPARATUS FOR MICROPROCESSOR CONTROLLED SPRAYER

FIELD OF THE INVENTION

This invention relates to a boomless spray apparatus and method, and more particularly, to a microprocessor controlled boomless spray apparatus and method which is controlled by operator of the vehicle to which the apparatus is attached. The spray apparatus is a multiple chemical infusion delivery system for mobile spraying of liquid material onto a target at preset, controlled, and monitored application rates, controlled by dynamic manipulation integrating ground speed, solute concentration, diluent volume, and spray swath width.

DESCRIPTION OF PRIOR ART

Prior art methods of applying agrochemicals include bulk tank mixing of chemicals (solute) with water (solvent). Bulk tanks usually hold between 500 gallons and 2000 gallons of water. The quantity of water is estimated or measured into the tank. Mixing is accomplished by a variety of methods.

Bulk tank mixing is complicated by possible spillage and inappropriate concentrations (because of uncertain quantities of water in the bulk tank), worker exposure and contamination while mixing the chemical, inappropriate concentrations of chemical because of inadequate mixing and precipitation of chemical out of solution during application of the bulk tank contents, and inaccurate application rates because of poorly monitored ground speed during application. In addition, bulk tank mixing often leaves an excess of mixed chemicals after the application job is completed leaving the operator with a disposal problem.

The cost of agrochemicals (fertilizer, herbicides, pesticides, fungicides, growth retardants, and related chemicals) has escalated in recent years. Sophisticated research provides a new generation of agrochemicals with chemical efficiency within specific concentration and application parameters. Uniform application of chemicals with a known concentration is crucial for successful use of these new agrochemicals.

Mis-application of agrochemicals results in increased cost of chemicals to the user and loss of income because of poor production after over or under application of agrochemicals.

Mechanized apparatus (such as that disclosed in U.S. Pat. Nos. 4,252,274 and 4,315,602) are designed and used primarily for application of herbicides. This equipment does not utilize real time dynamic microprocessors with read only memory, radar ground speed detectors, and other elements disclosed in this application.

SUMMARY OF THE INVENTION

In summary, this invention is directed to a microprocessor-controlled spray apparatus, attachable to a mobile unit, for application of agrochemicals to right-of-ways, fields, pastures, parks, cemeteries, airports, forests, orchards and aerial areas. It is a multiple chemical infusion delivery system for mobile spraying of liquid mixtures at preset, controlled, and monitored application rates which integrate ground speed, solute concentration, diluent volume and spray swath path using dynamic, real time software in digital computer unit with a read only memory chip. It includes a frame, water tank, chemical supply tanks, peristaltic pumps, hoses, pressure regulators and gauges, hydraulic cylinders, and spray nozzle tips. It is mounted on trucks or other land vehicles, water vehicles, and air vehicles.

The primary object of this invention is to provide a computerized mobile spray system in which concentration of spray mixture is computer controlled based on per acre application concentration, ground speed, and spray swath width data.

Another object of this invention is to provide a spray apparatus with chemical infusion systems capable of simultaneous or independent application of a plurality of chemicals.

A further object of this invention is to provide a spray system which mixes chemicals in the main spray pump at the time of application thereby eliminating bulk tank mixing.

A further object of this invention is to provide a spray apparatus which reduces environmental contamination by eliminating dumping of unused pre-mixed tank chemicals in rinsing of water tank, and minimizes worker exposure.

A further object of this invention is to provide a spray apparatus with a boomless spray head assembly capable of variable spray swath path controlled by the operator.

A further object of this invention is to provide a spray apparatus capable of precise chemical mixing by squeeze pumps.

A further object of this invention is to provide a spray apparatus controlled by a real time dynamic processor with digital readout and read only memory chip.

A further object of this invention is to provide a spray apparatus capable of reducing the volume of water applied per acre in the spray mixture.

BRIEF DESCRIPTION OF DRAWINGS

Other objects of this invnetion will appear in the following description and claims, reference being made to the accompanying drawings which form a part of the specification.

FIG. 1*a* is perspective view of the right side of this invention mounted on a truck.

FIG. 1*b* is a perspective view of the left side of this invention mounted on a truck.

FIG. 2 is a schematic view of a spray apparatus of this invention.

FIG. 3 is a plain view of the chemical infusion system of this invention.

FIG. 4 is a plain view of the centrifugal pumping system of this invention.

FIG. 5 is a plain view of the pressure monitoring system of this invention.

FIG. 6 is a plain view of the spray head assembly with connection to pressure monitors of this invention.

FIG. 7 is an expanded view of the spray head assembly of this invention.

FIG. 8 is a perspsective view of the radar ground speed detector of this invention.

FIG. 9*a* is a plain view of the centrifugal pump clutch assembly of this invention.

FIG. 9*b* is an expanded view of the centrifugal pump assembly of this invention.

FIG. 10 is a schematic view of the plumbing and control valves of this invention.

FIG. 11 is an elevational view of the controls for the microprocessor of this invention.

FIGS. 12, 13, and 14 are block diagrams of the basic systems of a preferred embodiment of this invention.

FIGS. 15 and 16 illustrates an electrical schematic circuit diagram used in a preferred embodiment of this invention.

DESCRIPTION OF THE PREFERRED EMBODIMENTS

Figure 1A:
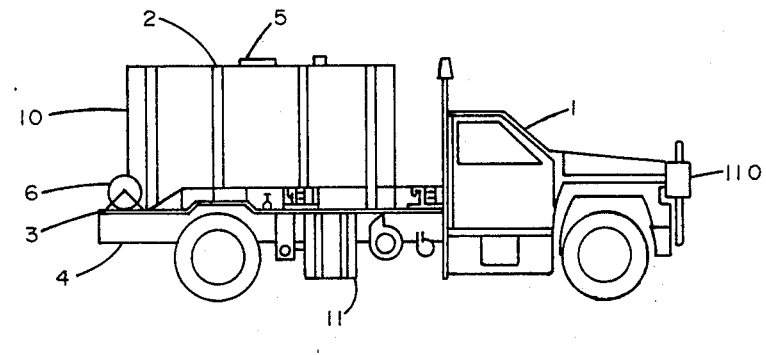
Figure 1B:
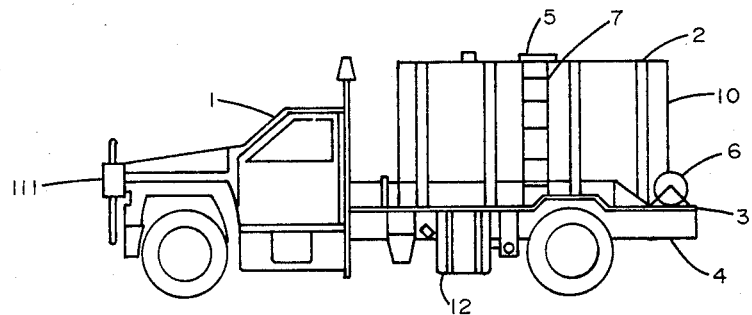
Figure 3:
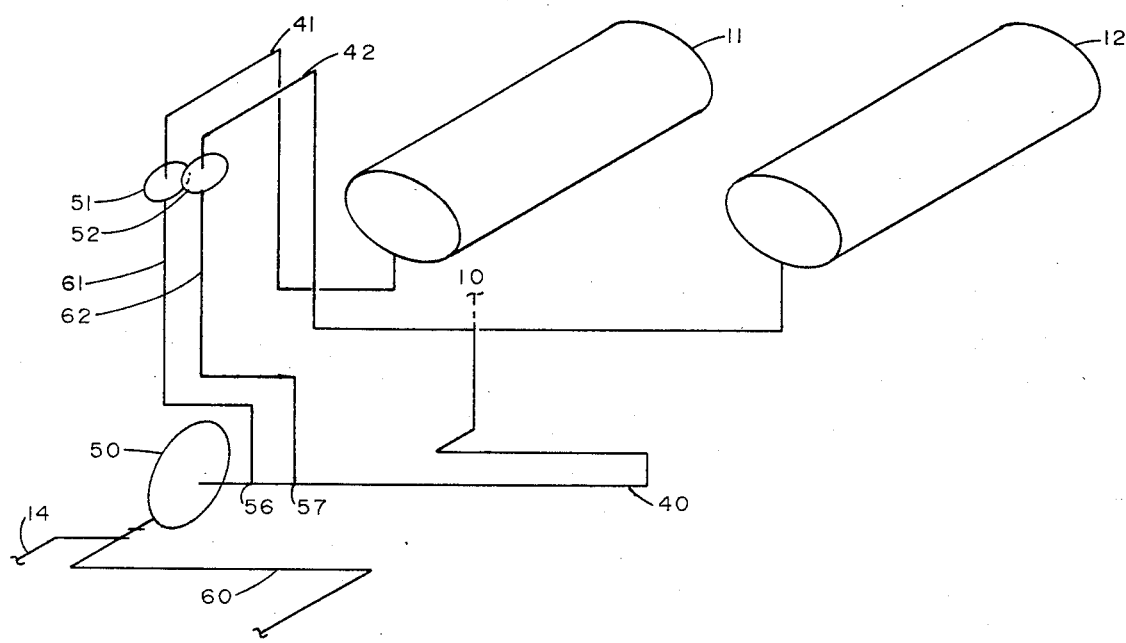
Figure 7:
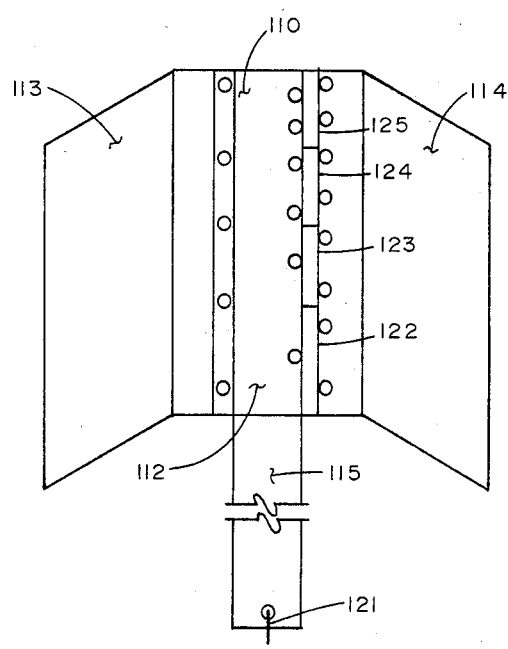

Referring now to FIG. 1a, there is shown an illustrative embodiment of the microprocessor-controlled spray apparatus attached to motor truck (1). The spray apparatus is a multiple chemical infusion delivery system for mobile spraying of liquid material onto a target at preset, controlled, and monitored application rates. The spray apparatus can be used to apply one or more chemicals, independently or simultaneously. Water supply tank (10) is attached to frame (4) by attaching straps (2). Frame (4) sits out and is secured to the rear truck chassis. Tank (10) is filled through fill port (5) on top of tank (10). Chemical tank (11), seen in greater detail in FIG. 3, is attached to the underside of frame (4). Spray head assembly (110), seen in greater detail in FIG. 7, is attached to the front of truck (1). Hose reel (6) for spot spraying is attached to the rear of the truck. FIG. 1b shows the left side of truck (1) with ladder (7) which extends from catwalk (3) to fill port (5). The left chemical tank (12) is attached to the left side of frame (4).

Figure 2:
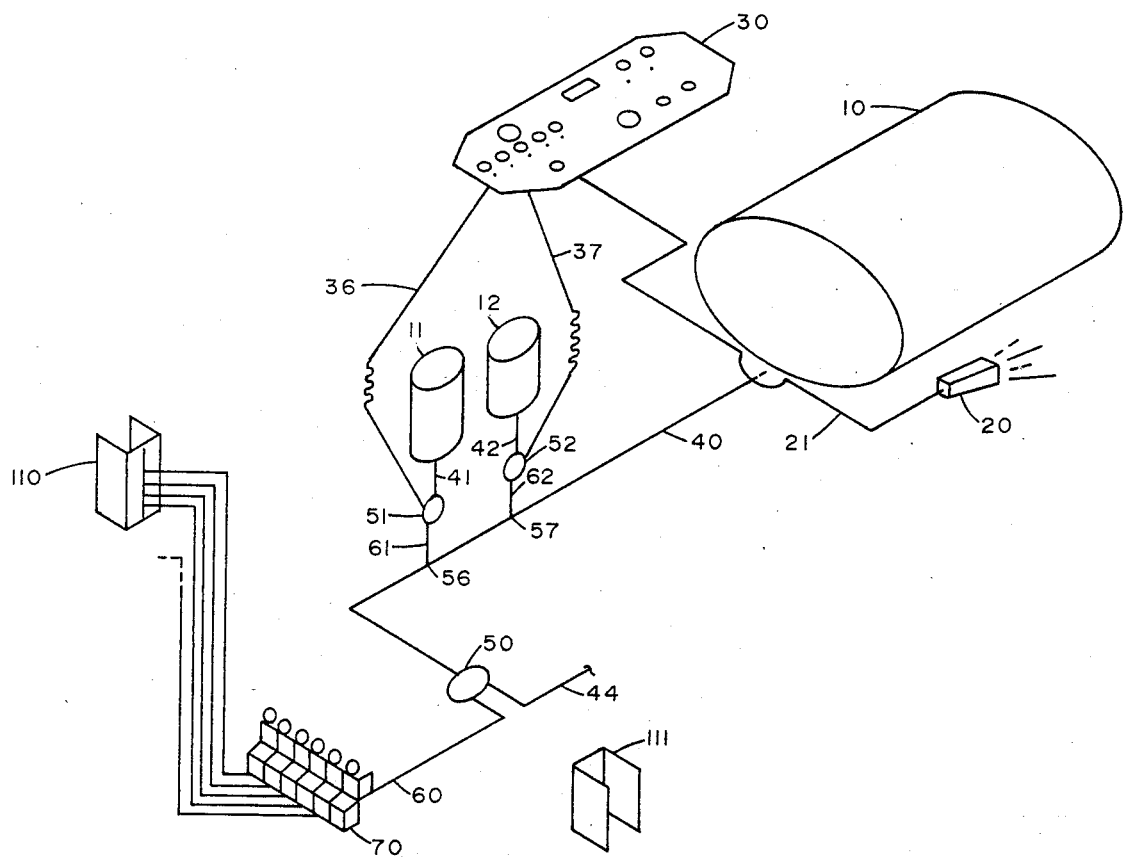

FIG. 2 is a schematic diagram of the spray apparatus including water tank (10) for supplying solvent water, radar ground speed detector (20) for determining ground speed, microprocessor unit (30) for receiving and processing electrical input signals, chemical storage tanks (11) and (12) for supplying solute chemicals to be applied, peristaltic pumps (51) and (52), individually connected to chemical storage tanks (11) and (12), and centrifugal pump (50) for mixing the solute-solvent mixture and pumping the mixture out of spray head assembly (110). The radar ground speed detector (20) is electrically connected to the microprocessor (30) through connection (21). The microprocessor (30) provides an output impulse through connection (36) and (37) to commercially available peristaltic pumps (51) and (52) respectively. The peristaltic pumps (51) and (52) are connected to chemical storage tanks (11) and (12) by rubber hoses (41) and (42) respectively, through which solute chemicals to be applied are withdrawn. Rubber chemical hose connection (40) connects water supply tank (10) to centrifugal pump (50). Rubber chemical hose (40) has a port system connecting to hoses (61) and (62) which in addition connect to the peristaltic pumps (51) and (52).

FIG. 3 is a plain view of the chemical infusion system including chemical storage tanks (11) and (12), rubber chemical hose connections (41) and (42) which connect peristaltic pumps (51) and (52) to chemical storage tanks (11) and (12), and outflow connections (56) and (57) which connect peristaltic pumps (51) and (52) to the chemical rubber hose (40) which runs from water supply tank (10) to centrifugal pump (50). Peristaltic pumps (51) and (52) work on a squeeze principle and are driven by variable speed direct current motors. The peristaltic pumps (51) and (52) and are connected to individual chemical supply tanks (11) and (12) by chemical rubber hoses (41) and (42). The peristaltic pumps are suction fed from the chemical tanks. The solute outflow for peristaltic pumps (51) and (52) create a low-pressure feed into chemical rubber hose (40) running from the water supply tank (10) to the centrifugal pumps (50) feeding the suction side of the centrifugal pumps (50). This disclosure illustrates an apparatus with two chemical infusion systems; however, plurality of chemical infusion systems can be fed into the centrifugal pump (50), and electrically operated independently or simultaneously. The microprocessor generates an individual pulse to each peristaltic pump to control pump revolutions per minute and subsequently a specific infusion rate based on calibration data.

Figure 4:
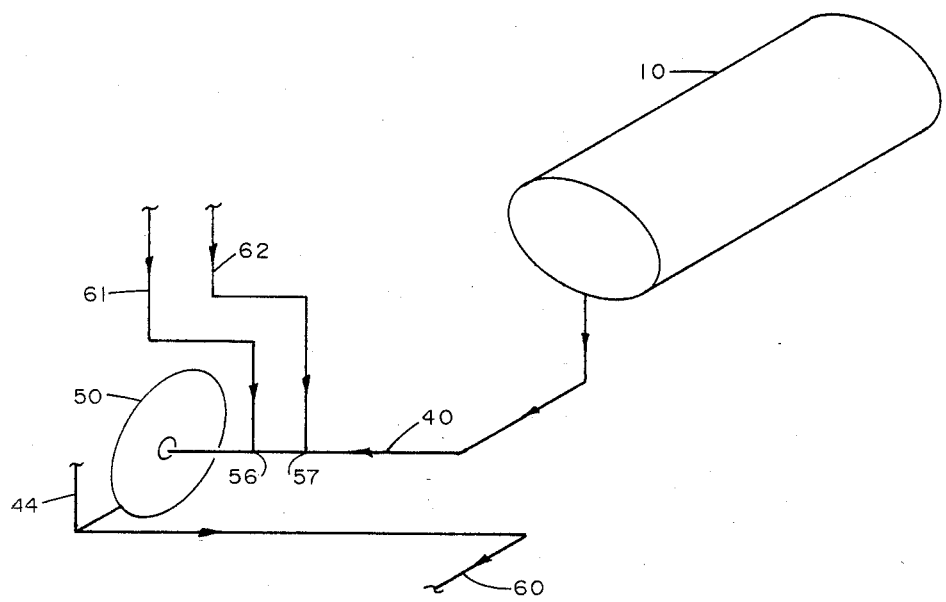

FIG. 4 is an expanded view of the spray pumping system including centrifugal pump (50), hose connection (40) which runs from solvent water supply tank (10) to centrifugal pump (50) and hose connection (60) which runs from centrifugal pump (50) to the manifold (seen in FIG. 5) on front of the vehicle and including the chemical rubber hose (44) which runs to the hose reel assembly at the rear of the vehicle. The centrifugal pump (50) is belt driven and powered by an independently throttled internal combustion engine (not shown). The centrifugal pump (50) suctions water from water supply tank (10) and chemicals from the chemical infusion systems through port connections (56) and (57). Chemical hose connections (61) and (62) feed into chemical rubber hose (40) through port connections (56) and (57) respectively. The water and chemicals are mixed in the centrifugal pump (50) by the centrifugal forces of the pump. The solute solvent spray mixture is pumped out of the centrifugal pump (50) to the manifold (seen in FIG. 5) through chemical rubber hose (60) under pressure.

Figure 5:
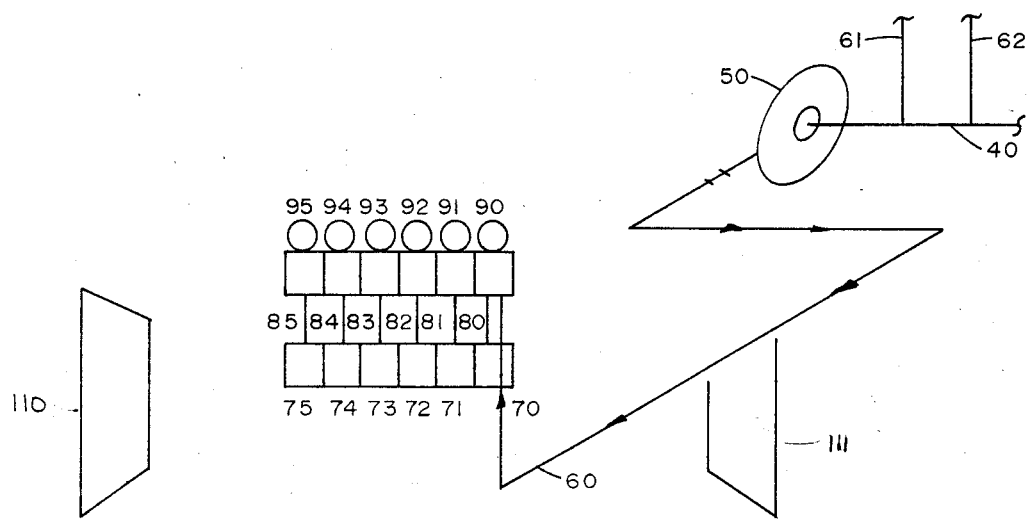

FIG. 5 is a plain view of the pressure monitoring system including centrifugal pump (50), chemical rubber hose (60), manifold (70), and pressure gauges (90), (91), (92), (93), (94), (95). The pressure monitor gauges are located in clear view of the operator (not shown). Display gauge (90) displays line (60) pressure in pounds per square inch (psi) and is generally in the 30-60 psi range depending on the output of the centrifugal pump (50). The spray mixture then flows into manifold (70) which has five compartments with the pressure in each baffle compartment displayed by pressure gauges (91), (92), (93), (94), (95). Each baffle is controlled by a solenoid valve (81), (82), (83), (84), (85) which in turn is controlled by an off/on switch on the microprocessor control panel, seen in greater detail in FIG. 11. Line butterfly valve shutoff (80) is electrically controlled from the cab by the operator.

Figure 6:
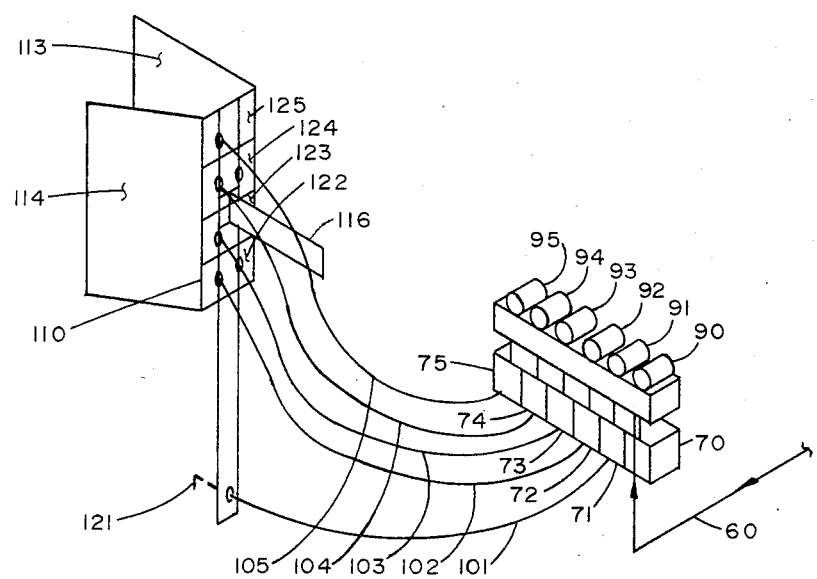

FIG. 6 is a plain view of spray head assembly (110) and its connections to manifold (70). Spray head assembly (110) has four sections, seen in FIG. 7, designated (122), (123), (124), and (125). Each of sections (122), (123), (124), (125) have a plurality of nozzles. The distal spray zone section (125) is connected to the baffle/solenoid/pressure gauge complex (75) by chemical rubber hose (105). The distal mid-spray zone section (124) is connected to the baffle/solenoid/pressure gauge complex (94) by chemical rubber hose (104). The proximal mid-spray zone section (123) is connected to the baffle/solenoid/pressure gauge display (73) by chemical rubber hose (103). The proximal spray zone section (122) is connected to the baffle/solenoid/pressure gauge display (72) by chemical rubber hose (102). The spot spray nozzle (121) is connected to the baffle/solenoid/pressure display (91) by chemical rubber hose (101).

The width of the spray swath path is determined by activation-deactivation of sections (122-125). The nozzles, commercially available, on section (125) are designed and oriented to spray distal; the nozzles on section (124) are designed and oriented to spray mid-distal;

the nozzles on section (123) are designed and oriented to spray mid-proximal; and the nozzles on section (122) are designed and oriented to spray proximal. Control is by individual connection to a baffle/solenoid/pressure gauge complex (71-75), controllable from the microprocessor control panel.

FIG. 7 is a plain front view of the right spray head assembly (110), showing spray zone sections (122), (123), (124), (125) and spot spray nozzle (121). In general, the spray head assembly (110) comprises a frame (112), guards (113) and (114) for protecting the nozzles, and a shaft (115), which extends down below the frame on which the spot spray nozzle (121) is located. The spray head assembly (110) is attached to the front of truck (1) (seen in FIG. 1) by stabilizing bar (116). The spray head assemblies are attachable to the respective right and left sides of the truck, and the spray coupling hoses (101), (102), (103), (104), (105) can be moved to the opposite side of the truck or the entire spray head assembly can be moved to the opposite side of the truck and fastened with the stabilizer bar when spraying from the opposite side of the truck is indicated. Alternatively, simultaneous and bilateral spraying can be accomplished by inserting Y-connectors at the chemical rubber hoses (101), (102), (103), (104), (105) at the level of the manifold and attaching corresponding chemical rubber hoses to the left spray assembly. The spray head for the right and left side are identical, and thus only one is dicussed in this disclosure.

Figure 8:
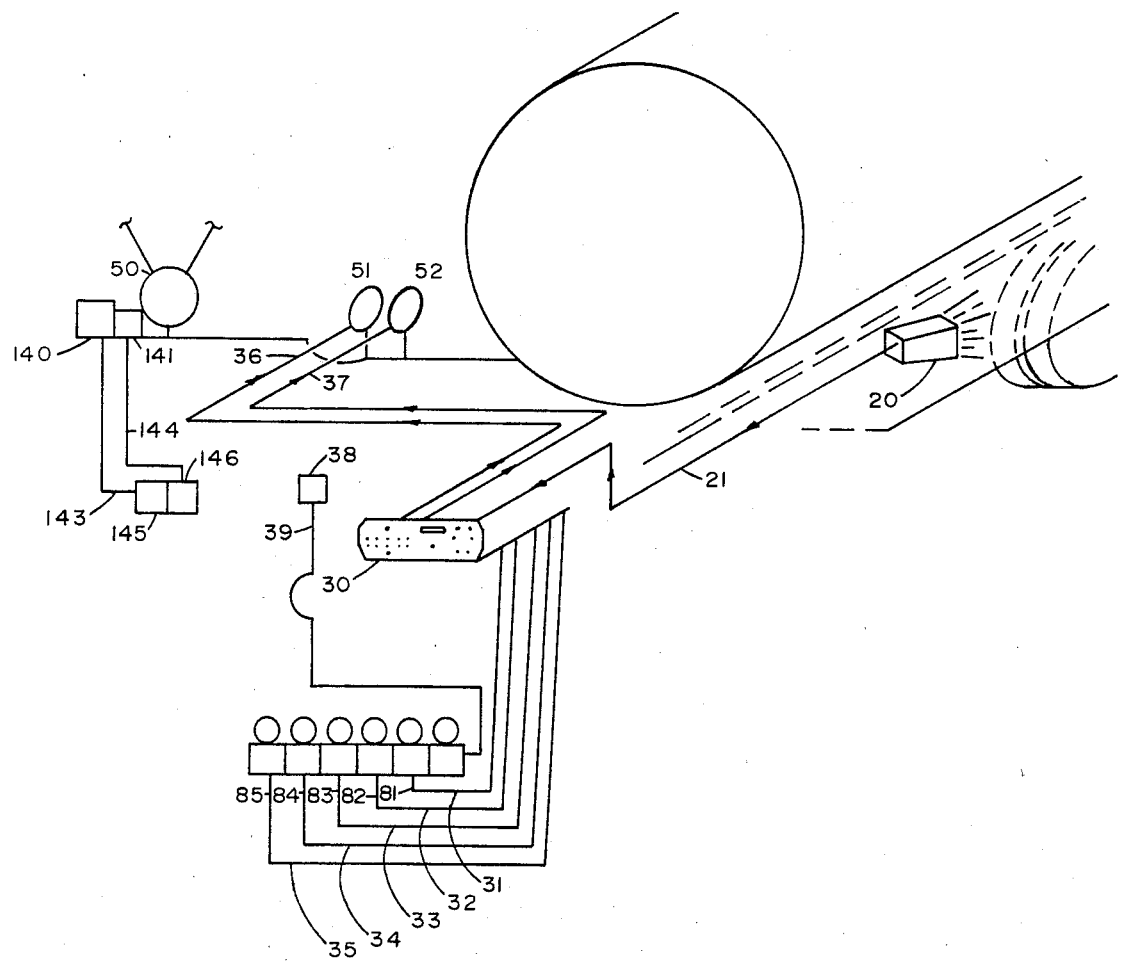

FIG. 8 is a schematic view of the ground speed detector. In this embodiment, means for determining ground speed of the vehicle (1) is by commercially available radar ground speed detector (20). Pulse from the radar ground speed detector (20) is transmitted to the microprocessor (30) by an electrical connection (21). The electrical pulse is processed by the microprocessor (30) to control the revolutions per minute of the peristaltic pumps (51) and (52), either simultaneously or individually, thereby controlling the amount of chemical being delivered into the spray mix based on ground speed. These impulses are transmitted by electrical connections (36) and (37). In an alternate embodiment, ground speed is determined by commercially available magnetic ground speed detector.

Figure 9A:
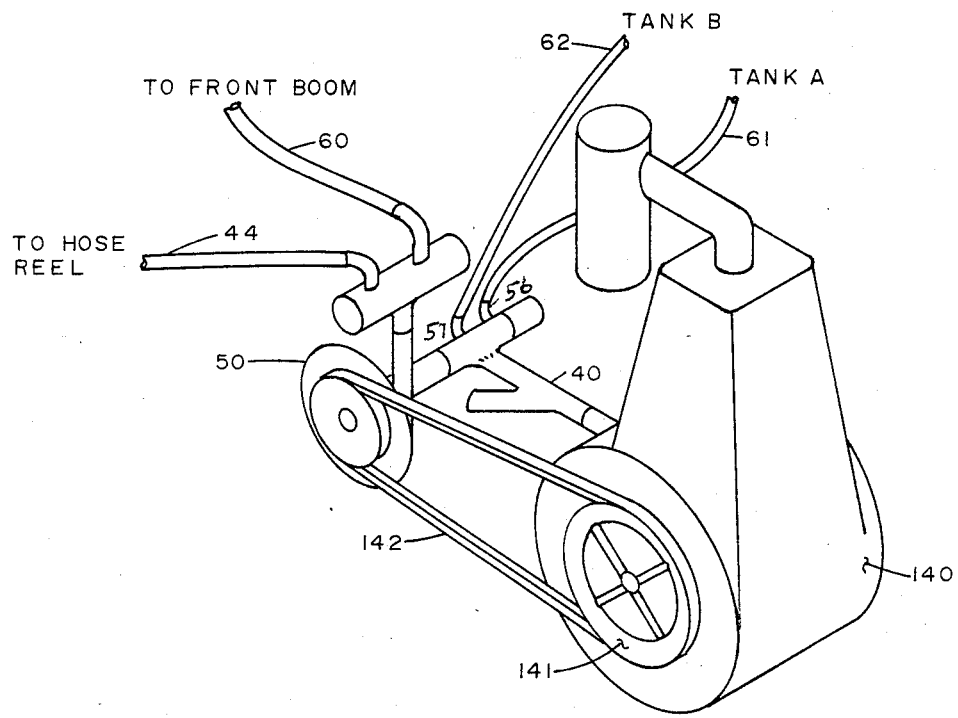

FIG. 9a is a plain view of centrifugal pump (50) including the internal combustion engine (140) which is mechanically throttled by the operator from the cab, clutch assembly (141) which is electrically controlled by the operator from the cab, and belt linkage (142) which drives centrifugal pump (50) suctioning water from the water supply tank (10) through rubber chemical hose (40). Chemicals delivered from peristaltic pumps (51) and (52) feed into the chemical rubber hose (40) through coupling ports (56) and (57). The pump action of the centrifugal pump (50) mixes the chemical mixture and pumps the solution out chemical rubber hose (60) to manifold (70) (not shown) and out chemical rubber hose (44) to the hose reel (6) at the rear of the truck (seen in FIG. 1). Hose reel (6) can be used for manual spraying when appropriate. There is an off-on valve controlling outflow through hose (44).

Figure 9B:
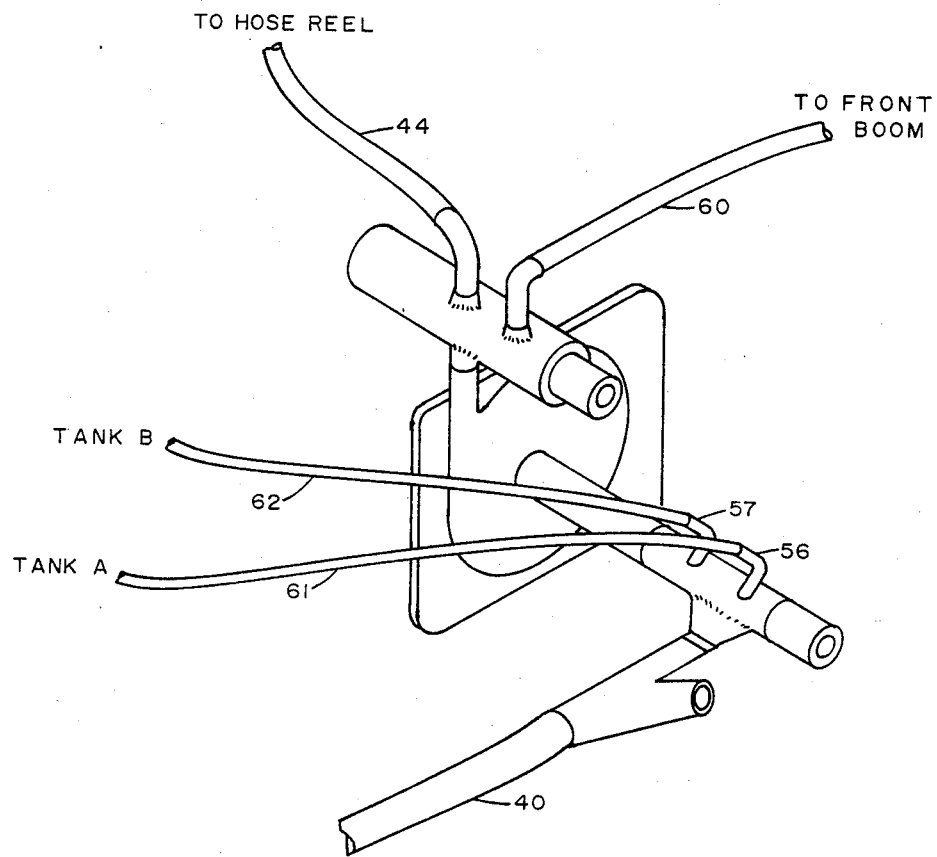

FIG. 9b shows an expanded view of the port system with chemical rubber hose (40) supplying water to the centrifugal pump which is also fed by chemical rubber hose from the chemical tanks (not shown) by way of chemical rubber hose (61) and (62) through coupling ports (56) and (57). The solution then leaves the centrifugal pump on the outflow side under pressure through the chemical rubber hose (60) to the manifold at the front of the truck (not shown) and through chemical rubber hose (44) to the hose reel at the rear of the truck (not shown).

Figure 10:
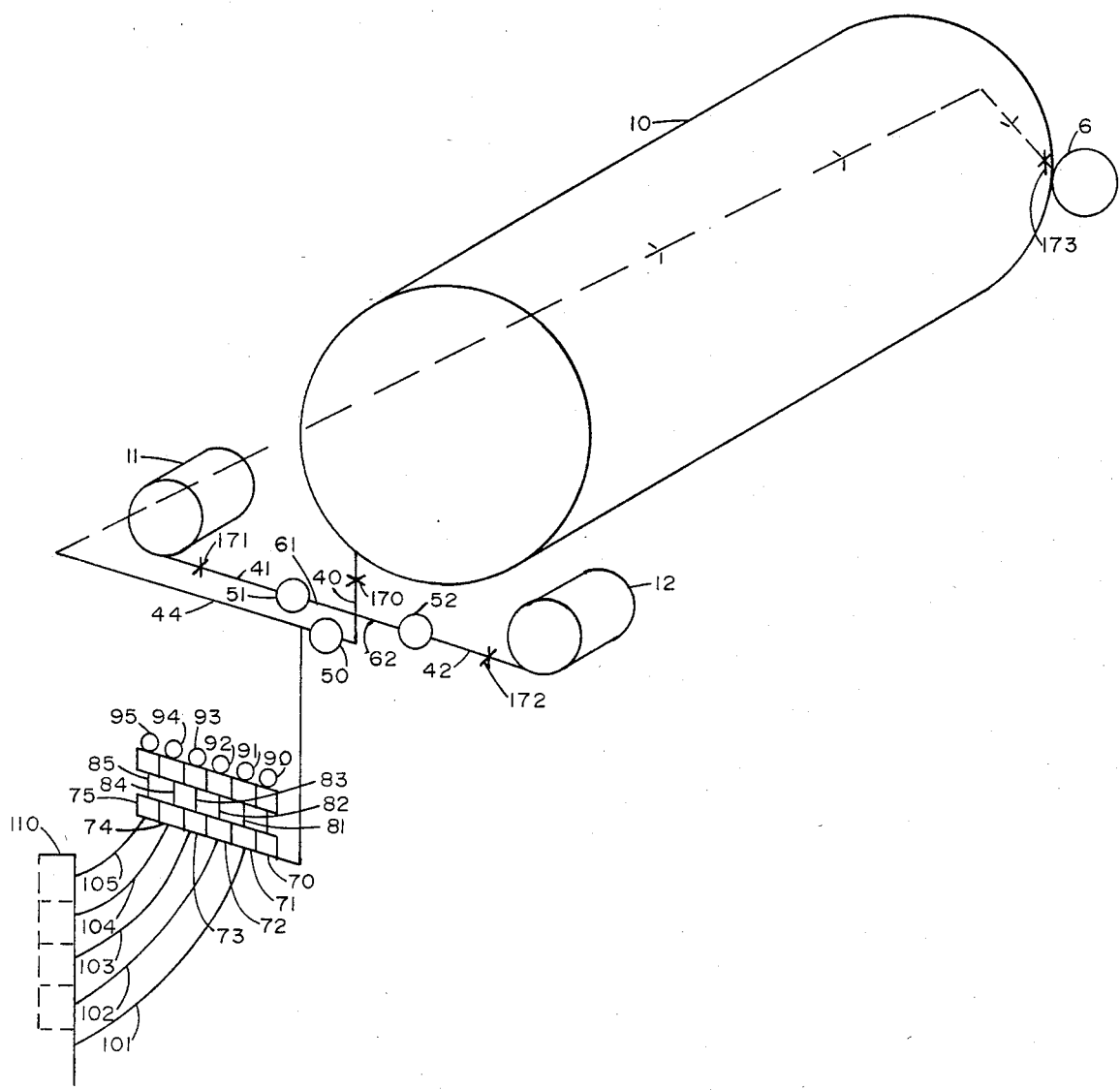

FIG. 10 is a schematic view of the plumbing and control valves of the preferred embodiment of this invention. Manually conrolled valves include water tank valve (170), chemical tank valve (171), chemical tank valve (172), and hose reel valve (173). Electrically controlled valves include solenoid valves (81), (82), (83), (84), (85), which are controlled by an off/on switch on microprocessor control panel (150) (not shown).

Figure 11:
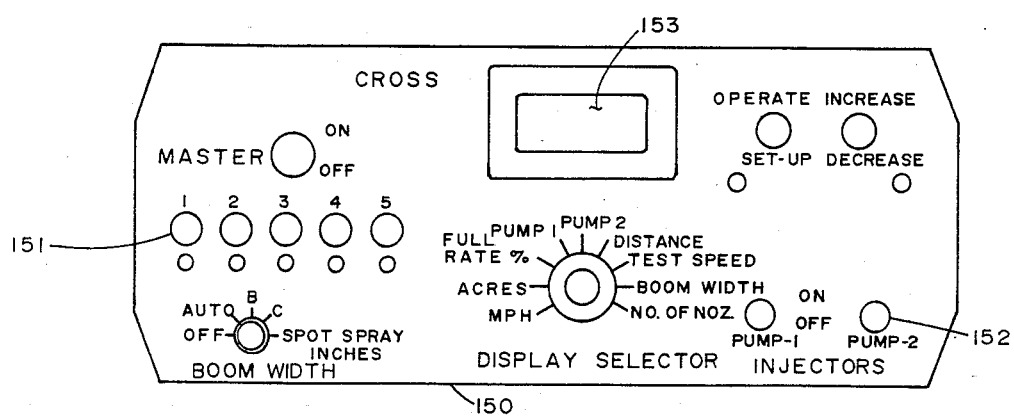

The microprocessor (30) utilized in the spray apparatus is a real time microprocessor with a chip programmed to receive and process (a) an electrical pulse from ground speed detector, (b) switch entered electrical signal of spray swath width, and (c) switch entered electrical signal of application rate per acre. Referring to FIG. 11, there is shown an illustrative embodiment of the microprocessor control panel (150), which is mounted in cab of truck in clear view of operator. Switch series (151) control on/off mode of solenoid valves (81-85). Switch series (152) control the chemical infusion system through peristaltic pumps (51) and (52). Digital display panel (153) has readout capabilities for a number of parameters.

Further reference to FIG. 8 shows a schematic view of electrical connections including electrical connection (21) from radar ground speed detector (20) to microprocessor (30), electrical connection (36) from microprocessor (30) to peristaltic pump (51), electrical connection (37) from microprocessor (30) to peristaltic pump (52), electrical connection (31) from microprocessor (30) to spot spray solenoid (81), electrical connection (32) from microprocessor (30) to proximal spray solenoid (82), electrical connection (33) from microprocessor (30) to proximal mid-spray solenoid (83), electrical connection (34) from microprocessor (30) to distal mid-spray solenoid (84), and electrical connection (35) from microprocessor (30) to distal-spray solenoid (85). Other electrical connections include electrical connection (39) from in-cab control switch (38) to butterfly main shut-off valve.

Microprocessor control unit (30) controls the operation of peristaltic pumps (51) and (52), and solenoid valves (81-85) of spray head assembly (110), thereby controlling the spray mixture to be applied. This control system provides a spray system which mixes chemicals in the main spray pump (50) at the time of application. All controls are read by the software and then acted upon by the microprocessor (30). Microprocessor control panel (150), seen in FIG. 11, provides a housing for microprocessor (30). Control panel (150) can be mounted on the dashboard of vehicle for easy adjustment by operator. A variety of events can be selected and displayed at digital display (153).

Figure 12:
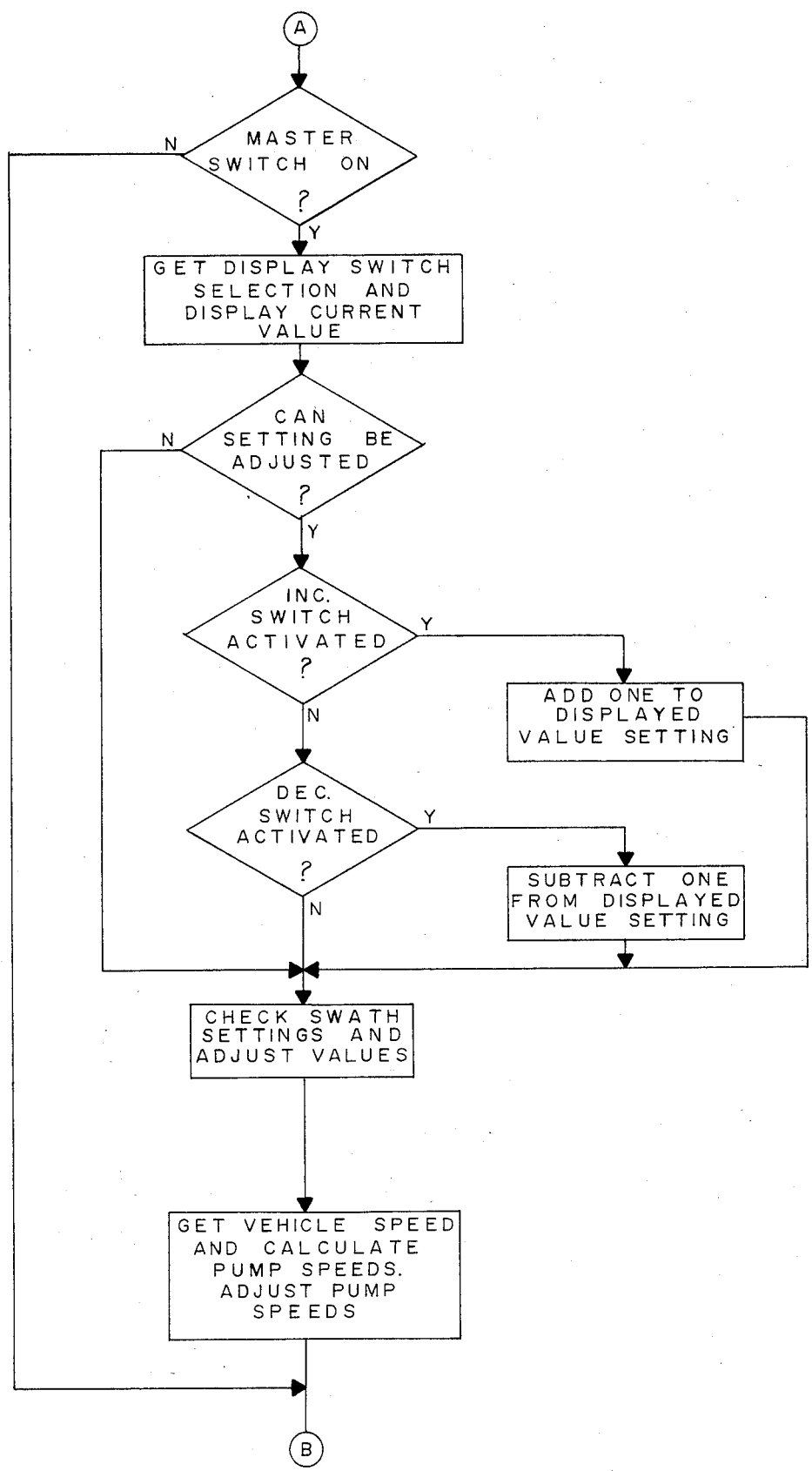
Figure 13:
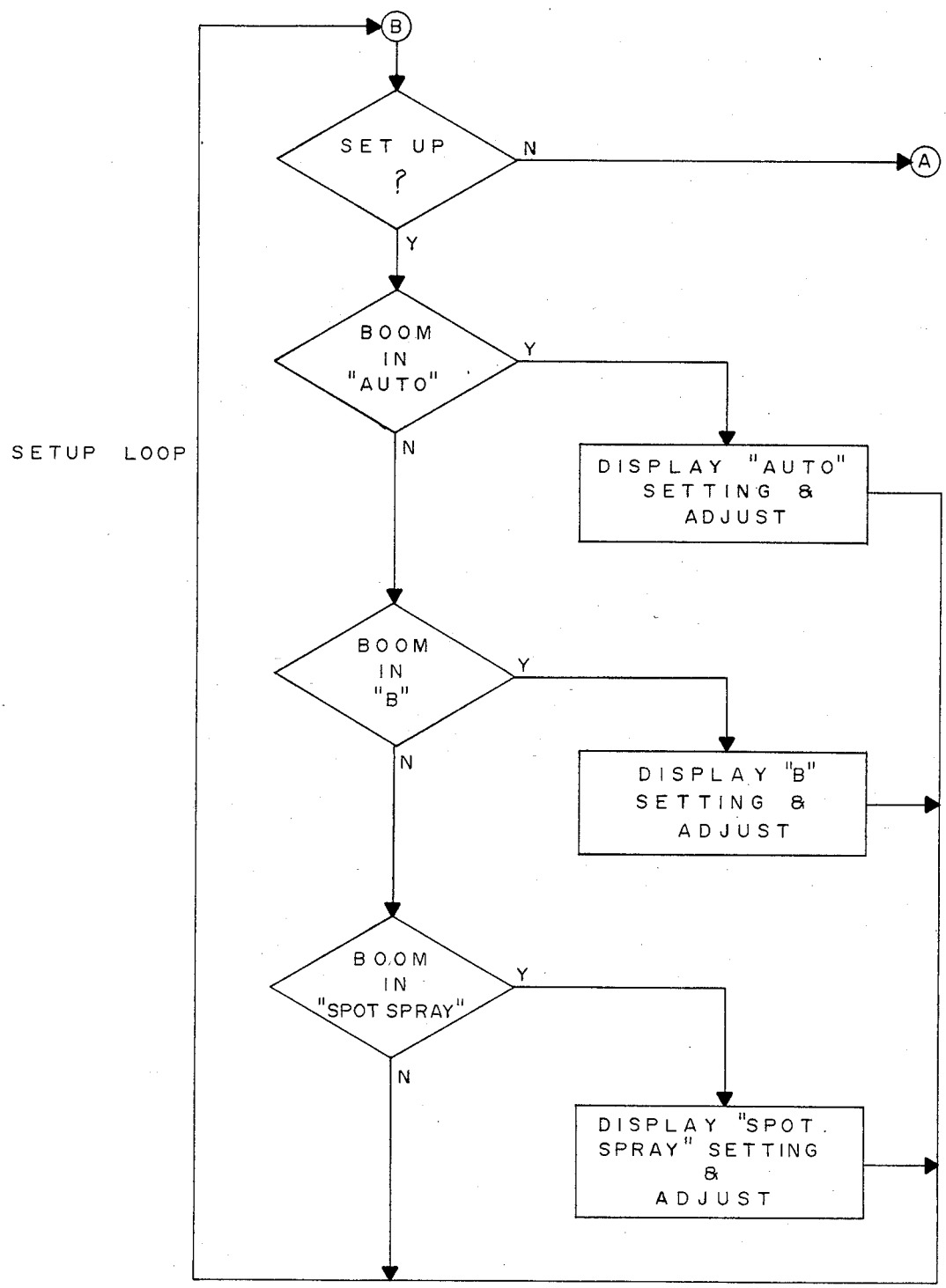
Figure 14:
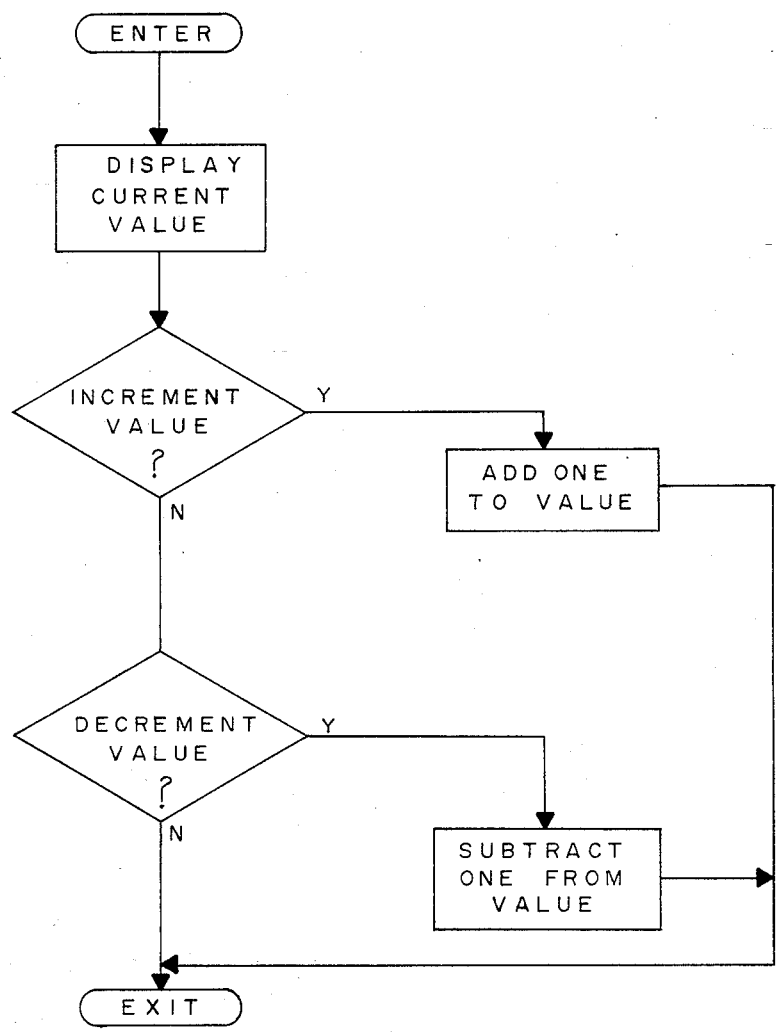

Referring to FIG. 13, there is shown the setup loop for the program flow of microprocessor (30) of a preferred embodiment of the invention. Referring to FIG. 12, there is shown a block diagram of microprocessor (30) operational flow, and reference to FIG. 14 shows a block diagram for display and adjust.

Figure 15:
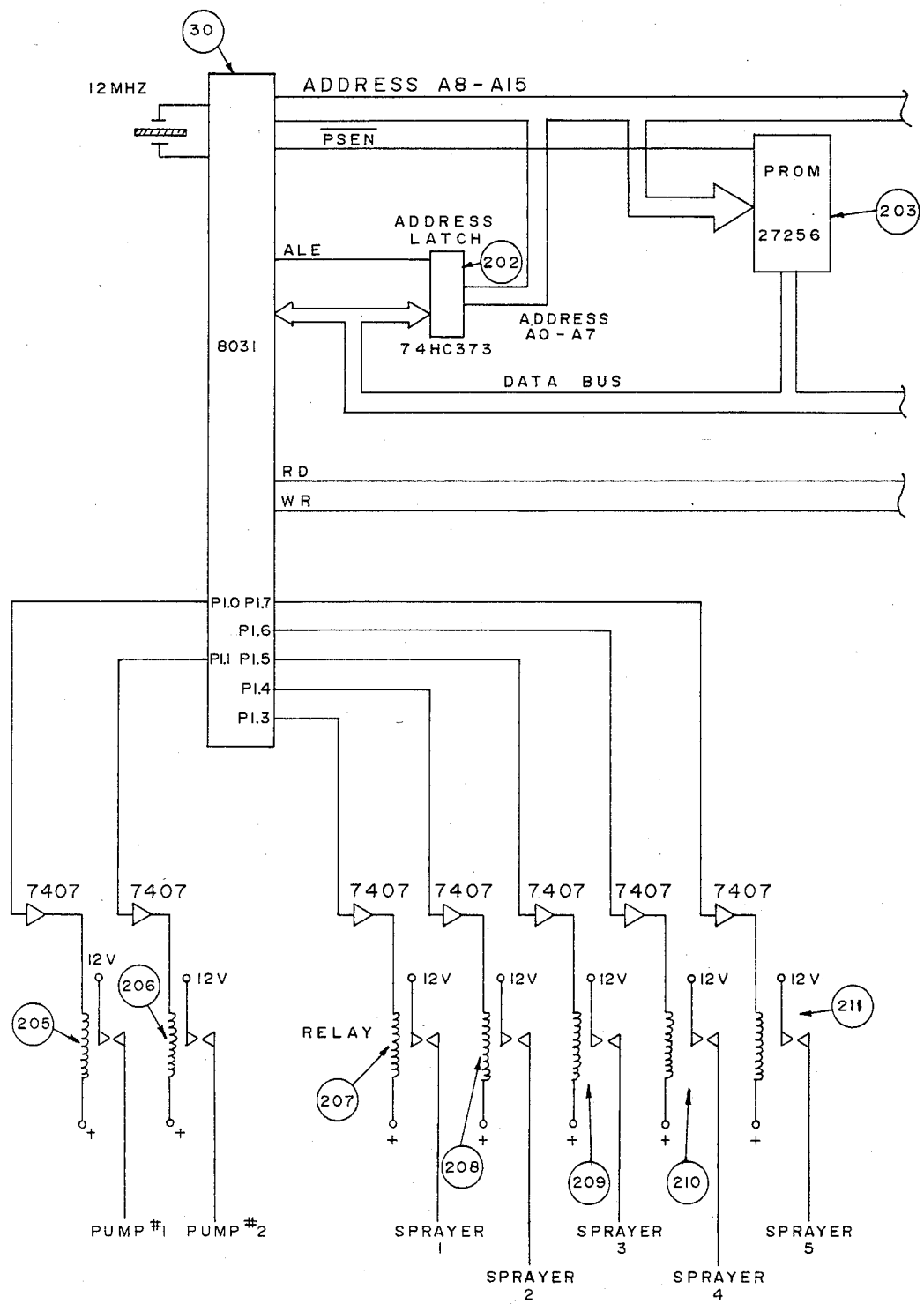
Figure 16:
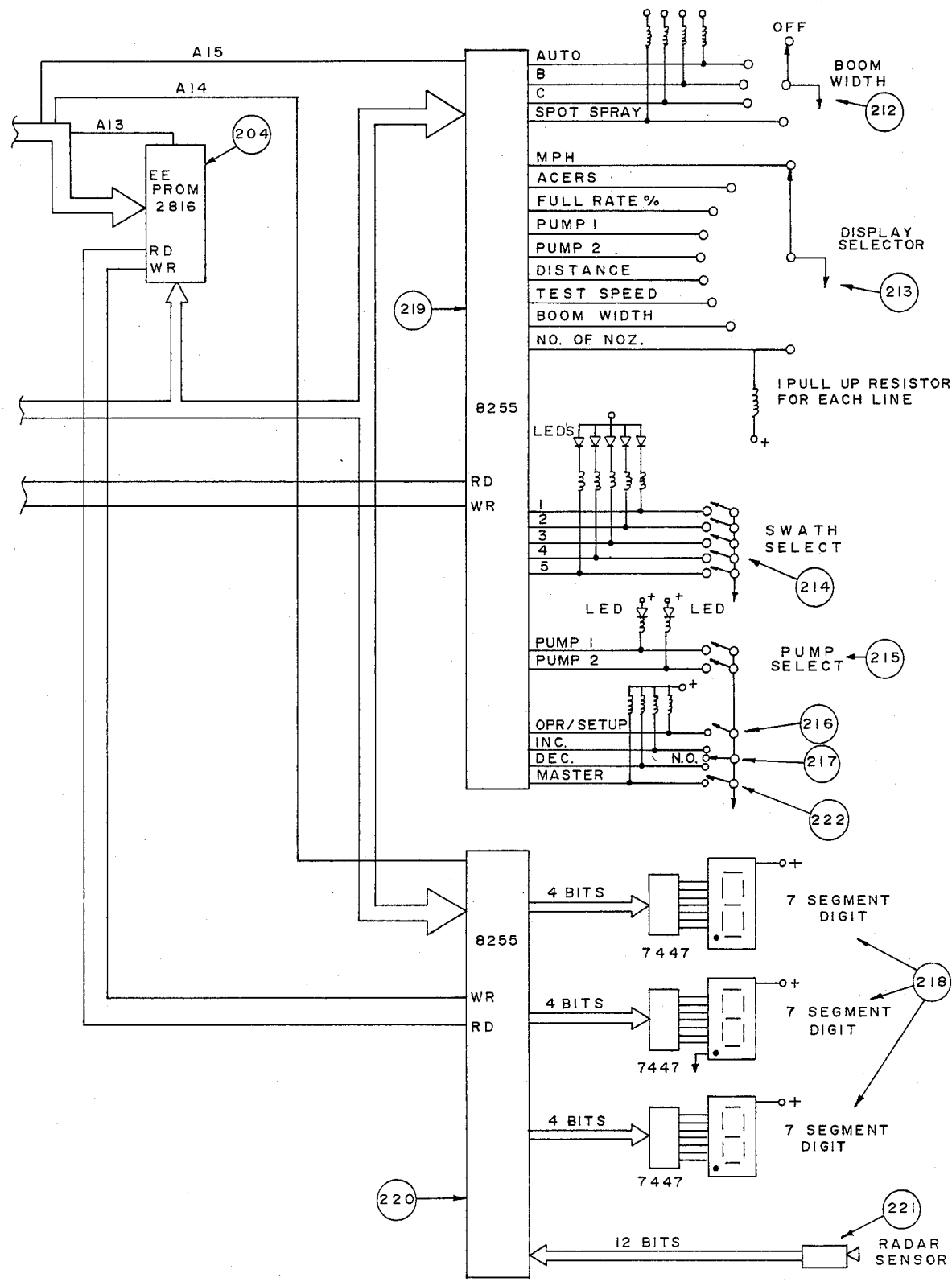

FIGS. 15 and 16 illustrate an electrical schematic circuit diagram used in a preferred embodiment of the invention. Microprocessor (30) outputs the lower memory address and activates the ALE signal to latch the address into the 74HC373 (202). The upper address is then outputted to the memory. The PSEN signal indicates to the system that the address is for the PROM (203) and the program codes will be read by the microprocessor (30). The Read (RD) and Write (WR) signals indicate to the system that the address is for the EEPROM (204) or the two 8255's (219) and (220), seen in FIG. 16. The upper address signals {A13=EEPROM/A14=8255 (220)/A15=8255 (219)} select the different memory devices. The I/O ports (8255's) are selected as if they were memory.

The output controls (205–211) are controlled directly from the microprocessor (30) through buffer gates 7407. The 7407 activate a relay which controls the peristaltic pump motors and sprayer solenoids. Normally the microprocessor (30) outputs a high signal (5 volts) to the output pins which turns the relays "off". When the microprocessor (30) needs to activate a particular relay, a low signal (0 volts) is applied to the output pin and the relay is turned "on".

Each input switch control is connected to a "pull-up" resistor so that the signal is normally at a "high" voltage (a 1 value) and the switch connects the signal to a ground level of zero volts (a 0 value). The boom switch (212) and display selector switch (213) are rotary switches and can be in only one position at a time. The increment / decrement switch (217) is a momentary switch with a normal "off" position. The other switches (214), (215), and (216) are "off"/"on" switches. The microprocessor (30) reads the switch inputs and determines which position the switches are in and then takes the appropriate action.

Displays (218) are of the seven segment type and use a 7447 display driver chip. The 7447 receives a 4 bit binary code and controls the number on the display (218). When the microprocessor (30) needs to display a value, three 4 bit codes are applied to the output port (220) and the value is displayed in digits (218). The value will remain in the displays until the microprocessor changes the 4 bit codes in the output port (220).

The vehicle speed is monitored by a radar device (221) and the rate is read by the microprocessor through the 8255 (220) input port. The value is a binary representation of the speed of the vehicle.

Referring back to FIG. 11, field operation of the sprayer is by the operator switch (150) entering desired spray swath path width operatively controlled by solenoid values (81–85), switch (152) entering the desired application rate operationally coupled to peristaltic pumps (51) and (52). Vehicle ground speed is automatically monitored by radar device (20). In general, the microprocessor receives and processes the electrical swath path width signal, the application rate signal, and the ground speed signal, to control the pump revolutions per minute of peristaltic pumps (51) and (52).

In a preferred and above illustrated embodiment of the invention, spray head assembly (110) is of the boomless type, being substantially panel shaped, having four sections (122–125) controllable by solenoid valves (81–84), respectfully. In an alternate embodiment, the spray head assembly is of the boom type. Sprayer booms having a spray bar with a plurality of nozzles are well known in the art. In the alternate embodiment, spray outflow line (60) could feed the spray mixture to the sprayer boom.

The above described invention relates to a computerized apparatus and method for precise mixing and application of agrochemicals. While the invention has been described in the manner presently conceived to be most practical and preferred embodiment thereof, it will be apparent to pesons ordinarily skilled in the art that modifications may be made thereof within the scope of the invention, which scope is to be accorded the broadest interpretation of the claims such as to encompass all equivalents, devices, and methods.

What is claimed is:

1. A computerized chemical spray system attachable to a mobile unit for applying one or more chemicals at variable concentrations which mixes the chemicals in the spray pump at the time of application, comprising:
   a. a bulk water tank for supplying solvent water;
   b. a centrifugal pump connected to said water tank by a water feed line, said centrifugal pump having engine means to pump the liquid to be sprayed at a desired pressure;
   c. a spray outflow line connected at one end to said centrifugal pump and at other end to a spray head assembly having a plurality of spray nozzles for applying spray mixture to ground;
   d. a chemical storage tank containing chemical to be sprayed;
   e. a peristaltic squeeze pump having a chemical feed line connected at one end to said chemical storage tank and at other end to said water feed line;
   f. a microprocessor control unit electrically connected to said peristaltic pump, said unit having,
      1. a ground speed sensor means for measuring the ground speed of said mobile unit and developing a corresponding electrical ground speed signal,
      2. a desired chemical application rate control means for developing an application rate signal corresponding to a desired application rate of chemical per unit area,
      3. a programming means responsive to said ground speed signal and to said application rate signal for generating an infusion rate signal, where
      4. said rate infusion signal is operatively coupled to said peristaltic pump controlling pump revolutions per minute whereby the rate of infusion of chemical from said chemical tank into said water feed line is automatically adjusted to correspond to selected application rate values.

2. A spray system as recited in claim 1, wherein: said means for measuring ground speed is by a radar ground speed detector.

3. A spray system as recited in claim 1, wherein: said means for measuring ground speed is by a magnetic ground speed detector.

4. A spray system as recited in claim 1, wherein: said microprocessor is a real time microprocessor with chip programmed to receive said ground speed signal, switch entered electrical signal of chemical application rate to be applied per unit area, said microprocessor multiplies said application rate signal by said ground speed signal to generate an infusion rate signal to said peristaltic pump, whereby application rate is controlled by calibration input.

5. A spray system as recited in claim 4, wherein: said microprocessor has capability of processing said ground speed signal and said application rate signal generating infusion rate signals for a plurality of chemical infusion systems, independently or simultaneously.

6. A spray system as recited in claim 1, wherein: said peristaltic pump is driven by variable speed direct current drive motor.

7. A spray system as recited in claim 1, wherein: said centrifugal pump is powered by an internal combustion engine means where said engine is independent of engine powering said mobile unit to which said spray system is attached.

8. A spray system as recited in claim 7, wherein: said centrifugal pump and said internal combustion engine have clutch means for engaging and disengaging said engine to said pump, where said clutch assembly is electrically controlled by operator of said mobile unit.

9. A spray system as recited in claim 1, wherein: said centrifugal pump is powered by the power takeoff system of engine of said mobile unit.

10. A spray system as recited in claim 1, wherein: said spray outflow line connecting said centrifugal pump to said spray head assembly has pressure monitoring means with pressure display gauge located in clear view of operator.

11. A chemical spray system attachable to a vehicle for mixing chemicals to be sprayed in the spray pump at the time of application, comprising:
  a. a water tank for supplying solvent water
  b. a centrifugal pump connected to said water tank by a water feed line, said centrifugal pump being connected to an engine causing pump to pump the liquid to be sprayed at a desired pressure;
  c. a spray outflow line connected at one end to said centrifugal pump and at other end to a manifold having compartments, said compartments having solenoid valves for controlling spray outflow from individual compartments;
  d. a substantially panel shaped spray head assembly having individual sections with adjustable spray nozzles with respect to distance desired to be sprayed away from side of said vehicle, where said sections have individual pipe connections to said compartments of said manifold for controlling spray outflow through said sections;
  e. chemical storage tanks containing solute chemicals to be sprayed;
  f. peristaltic squeeze pumps, individually connected to said chemical storage tanks by a chemical feed line, where chemical feed lines connect on other end to said water feed line, where pump rate of said squeeze pump controls the amount of solute chemical being infused into the spray mixture;
  g. a microprocessor control system electrically connected individually to said peristaltic pumps and to said solenoid valves for controlling the amount of solute chemicals being infused into the spray mixture, said system having:
    1. a ground speed sensor means for measuring the ground speed of said vehicle and developing a corresponding electrical ground speed signal,
    2. a desired chemical application rate control means for developing an application rate signal corresponding to a desired application rate of chemical per unit area,
    3. a desired spray swath path width control means operatively associated with said solenoid valves for developing a swath path width signal of desired swath path,
    4. a programming means responsive to said ground speed signal, said application rate signal, and said swath path signal for generating an infusion rate signal, where said infusion rate signal is operatively coupled to said peristaltic pumps controlling pump revolutions per minute whereby the rate of infusion of said chemicals from said chemical tanks into said water feed line is automatically adjusted to correspond to selected application rate valves and selected swath path width.

12. A spray system as recited in claim 11, wherein: said compartments of said manifold have solenoid valves for controlling spray outflow from individual compartments, where said valves are controllable by electrical signal from said microprocessor.

13. A spray system as recited in claim 12, wherein: said manifold has five compartments, each of said five compartments has pressure monitoring means and display gauge thereof in clear view of operator.

14. A spray system as recited in claim 12, wherein: said spray head assembly is of the boomless type, and includes a panel with individual sections with plurality of nozzles.

15. A spray system as recited in claim 14 wherein: said panel of said assembly has sections, said sections having plurality of nozzles, where said nozzles are designed and oriented to spray at different angles covering different spray zones.

16. A spray system as recited in claim 15, wherein: said panel has four sections, one section for spraying distal spray zone, one section for spraying distal mid-spray zone, one section for spraying proximal mid-spray zone, and one section for spraying proximal spray zone, where said sections are individually connected to said compartments, and one of said compartments being connected to a mist nozzle on said spray head assembly.

17. A method for precise mixing of chemicals in a spray apparatus mounted on a moving vehicle utilizing a chemical infusion system controlled by a microprocessor where chemicals are mixed at time of application, comprising the steps of:
  a. Measuring ground speed of said moving vehicle having spray apparatus, developing ground speed signal, and feeding said signal to said microprocessor;
  b. Switch entering electrical signal of desired chemical application rate per unit area into microprocessor;
  c. Causing said microprocessor to process electronic data by multiplying said chemical application rate signal by said ground speed signal to generate an infusion rate signal;
  d. Feeding said infusion rate signal to a peristaltic pump having a variable speed direct current drive motor, thereby controlling revolutions per minute of said pump and subsequently specific infusion rate based on calibration data; and
  e. Feeding chemical outflow of said peristaltic pump which is suitably attached to chemical supply tank, to a line system having connections to a water supply tank and to a centrifugal pump, where said centrifugal pump pulls solvent water from said water supply tank and mixes with chemical being delivered by said peristaltic pump, and said centrifugal pump further delivers mixture to a spray head assembly for spraying on the ground.

18. The method as recited in claim 17, wherein: step (a) is practiced by measuring said ground speed by radar means.

19. The method as recited in claim 17, wherein: step (a) is practiced by measuring said ground speed by magnetic detector means.

20. The method as recited in claim 17, wherein: step (e) is practiced by said microprocessor being a realtime microprocessor with chip programmed to receive and process signals from step (a) and step (b).

21. The method as recited in claim 17, wherein: step (e) is practiced by said microprocessor being a real time microprocessor with read only memory, chip programmed to receive and process signals from step (a) and step (b).

* * * * *